United States Patent [19]

Nelson

[11] Patent Number: 4,760,107
[45] Date of Patent: Jul. 26, 1988

[54] BLENDS OF POLYCARBONATE RESINS AND POLYESTER RESINS EXHIBITING IMPROVED COLOR PROPERTIES

[75] Inventor: Linda H. Nelson, Evansville, Ind.

[73] Assignee: General Electric Company, Mt. Vernon, Ind.

[21] Appl. No.: 944,032

[22] Filed: Dec. 22, 1986

[51] Int. Cl.$^4$ .................. C08K 5/15; C08L 69/00
[52] U.S. Cl. ............................ 524/114; 523/447; 524/101; 524/537; 525/438; 525/439
[58] Field of Search ............... 525/438, 439, 463, 466; 524/386, 537, 114, 101; 523/447

[56] References Cited

U.S. PATENT DOCUMENTS

| | | | |
|---|---|---|---|
| 3,218,372 | 11/1965 | Okamura et al. | 525/439 |
| 3,622,538 | 11/1971 | Green | 524/386 X |
| 4,092,288 | 5/1978 | Calkins et al. | 524/154 |

*Primary Examiner*—Theodore E. Pertilla
*Attorney, Agent, or Firm*—Martin B. Barancik

[57] ABSTRACT

A resinous composition comprising:
(i) at least one aromatic polycarbonate resin;
(ii) at least one polyester resin; and
(iii) a minor amount of a mixture of at least one polyol and at least one epoxide.

34 Claims, No Drawings

BLENDS OF POLYCARBONATE RESINS AND POLYESTER RESINS EXHIBITING IMPROVED COLOR PROPERTIES

BACKGROUND OF THE INVENTION

Blends of polycarbonate resins and polyester resins are known in the art. For example, U.S. Pat. No. 3,218,372 discloses blends of polycarbonates and polyalkylene terephthalates, and U.S. Pat. No. 4,125,572 discloses blends of polycarbonates, poly(1,4-butylene terephthalate) and a copolyester of an aliphatic or cycloaliphatic diol and a mixture of terephthalic and isophthalic acids. These polycarbonate/polyester blends exhibit many excellent properties which render them useful as films, fibers, and molded articles. They exhibit, for example, better ductility than neat polyesters and better processability than neat polycarbonates. Many of these blends, however, have a tendency to discolor or yellow. It would be very advantageous if blends of polycarbonate/polyester resins which have a tendency to yellow could be provided which possessed improved color properties, i.e., reduced yellowing.

It has been discovered that color formation in those polycarbonate/polyester resin blends which tend to discolor can be reduced by adding thereto a minor amount of a mixture of at least one polyol and at least one epoxide.

SUMMARY OF THE INVENTION

In accordance with the instant invention there are provided resinous compositions comprising a major portion of a polycarbonate resin and a polyester resin and a minor portion of a mixture containing at least one polyol and at least one epoxide.

DESCRIPTION OF THE INVENTION

It has been discovered that color formation such as yellowing in those polycarbonate/polyester blends which have a tendency to discolor or yellow can be retarded or reduced by admixing with said blends a minor amount of a mixture comprised of at least one polyol and at least one epoxide. This combination of polyol and epoxide functions to reduce or inhibit undesirable color formation, particularly yellowing, in those polycarbonate/polyester blends which discolor or yellow. That is to say, the mixture of the polyol and epoxide, when incorporated into these blends, function as a color stabilizer or inhibitor in these blends.

The combination of the polyol and the epoxide is added to or admixed with the polycarbonate/polyester blends in relatively minor amounts. These color stabilized blends exhibit improved color properties, e.g., reduced yellowing, than comparable blends which do not contain the combination of the polyol and the epoxide.

This reduction or retardation of color, i.e., yellowing, by the color stabilizer combination of the instant invention is exhibited in blends containing a wide ratio of polycarbonate to polyester.

The polycarbonate resins utilized in the instant invention are conventional well known resins which are generally commercially available or may be readily prepared by well known conventional methods. These polycarbonates, as well as methods for their preparation, are described inter alia in U.S. Pat. Nos. 3,161,615, 3,220,973, 3,312,659, 3,312,660, 3,313,777, 3,666,614, and 3,939,672, all of which are incorporated herein by reference. The polycarbonate resins may be conveniently prepared by the interfacial polymerization process by the coreaction of at least one dihydric phenol with a carbonate precursor. Typically, the dihydric phenols utilized may be represented by the general formula

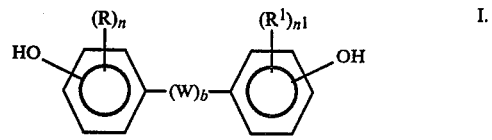

wherein:
R is independently selected from halogen, monovalent hydrocarbon, and monovalent hydrocarbonoxy radicals;
$R^1$ is independently selected from halogen, monovalent hydrocarbon, and monovalent hydrocarbonoxy radicals;
W is selected from divalent hydrocarbon radicals, —S—, —S—S—, —O—,

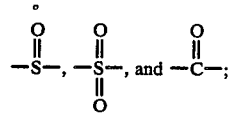

n and $n^1$ are independently selected from integers having a value of from 0 to 4 inclusive; and
b is either zero or one.

The monovalent hydrocarbon radicals represented by R and $R^1$ include the alkyl, cycloalkyl, aryl, aralkyl and alkaryl radicals. The preferred alkyl radicals are those containing from 1 to about 12 carbon atoms. The preferred cycloalkyl radicals contain from 4 to about 8 ring carbon atoms. The preferred aryl radicals contain from 6 to 12 ring carbon atoms, i.e., phenyl, biphenyl, and naphthyl. The preferred aralkyl and alkaryl radicals contain from 7 to about 14 carbon atoms.

The preferred halogen radicals represented by R and $R^1$ are chlorine and bromine.

The divalent hydrocarbon radicals represented by W include the alkylene, alkylidene, cycloalkylene and cycloalkylidene radicals. The preferred alkylene radicals are those containing from 2 to about 30 carbon atoms. The preferred alkylidene radicals are those containing from 1 to about 30 carbon atoms. The preferred cycloalkylene and cycloalkylidene radicals are those that contain from 6 to about 16 ring carbon atoms.

The monovalent hydrocarbonoxy radicals represented by R and $R^1$ may be represented by the formula —$OR^2$ wherein $R^2$ is a monovalent hydrocarbon radical of the type described hereinafore. Preferred monovalent hydrocarbonoxy radicals are the alkoxy and aryloxy radicals.

Some illustrative non-limiting examples of dihydric phenols of Formula 1 include:
2,2-bis(4-hydroxyphenyl) propane (bisphenol-A);
2,2-bis(3,5-dibromo-4-hydroxyphenyl)propane;
2,2-bis(3,5-dimethyl-4-hydroxyphenyl)propane;
1,1-bis(4-hydroxyphenyl)cyclohexane;
1,1-bis(3,5-dimethyl-4-hydroxyphenyl)cyclohexane;
1,1-bis(4-hydroxyphenyl)decane;
1,4-bis(4-hydroxyphenyl)propane;
1,1-bis(4-hydroxyphenyl)cyclododecane;

1,1-bis(3,5-dimethyl-4-hydroxyphenyl)cyclododecane;
4,4'-thiodiphenol; and
bis(4-hydroxyphenyl)ether.

Other dihydric phenols which are useful are described in U.S. Pat. Nos. 2,998,835, 3,028,365, and 3,334,154, all of which are incorporated herein by reference.

The carbonate precursor may be a carbonyl halide; a carbonate ester, or a bishaloformate. The carbonyl halides may be carbonyl bromide, carbonyl chloride, or mixtures thereof. The carbonate esters may be diphenyl carbonate; di(halophenyl)carbonates such as di(bromophenyl)carbonate, di(chlorophenyl)carbonate, and di(tribromophenyl)carbonate; di(alkylphenyl)carbonates such as di(tolyl)carbonate; di(naphthyl)carbonate, chlorophenyl chloronaphthyl carbonate; and phenyl tolyl carbonate. The bishaloformates that can be used include the bishaloformates of dihydric phenols such as the bischloroformates of bisphenol-A and hydroquinone; and the bishaloformates of glycols such as the bischloroformates of ethylene glycol, neopentyl glycol, and polyethylene glycol. The preferred carbonate precursor is carbonyl chloride, also known as phosgene.

A convenient process for the preparation of the instant polycarbonates is the interfacial polymerization process. The interfacial polymerization process utilizes two different solvent media which are immiscible. One solvent medium is an aqueous basic medium. The other solvent medium is an organic medium, such as methylene chloride, which is immiscible in said aqueous medium. Also employed in the interfacial polymerization process are molecular weight regulators which control the chain length or molecular weight of the carbonate polymer by a chain terminating mechanism, and catalysts. The molecular weight regulators are well known in the art and include, but are not limited to, phenol itself, p-tertiarybutyl phenol, and chroman I. The catalysts are also well known in the art and include, but are not limited to, tertiary amines such as triethylamine, quaternary ammonium compounds such as tetraethylammonium bromide, and quaternary phosphonium compounds such as n-butyltriphenyl phosphonium.

Also included with in the term polycarbonates are the randomly branched thermoplastic polycarbonates wherein a branching agent, which is generally a polyfunctional aromatic compound, is reacted with the dihydric phenol and the carbonate precursor. These polyfunctional aromatic compounds contain at least three functional groups which may be carboxyl, hydroxyl, carboxylic anhydride, haloformyl, and mixtures thereof. Some illustrative non-limiting examples of these aromatic polyfunctional compounds include trimellitic anhydride, trimellitic acid, trimellityl trichloride, 4-chloroformyl phthalic anhydride, pyromellitic acid, pyromellitic dianhydride, mellitic acid, trimesic acid, and benzophenonetetracarboxylic acid.

The aromatic polycarbonates contain at least one recurring structural unit represented by the general formula

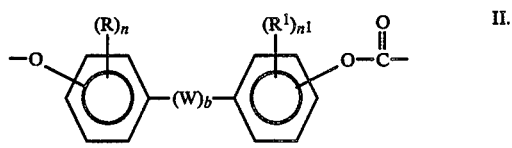

II.

wherein R, R$^1$, W, n, n$^1$, and b are defined hereinafore.

The polyester resins are well known in the art and are amply described, along with methods for their preparation, in the literature. They are described, inter alia, in U.S. Pat. Nos. 2,485,319, 3,047,539. 3,317,464, 3,351,624, 3,498,950, and 4,066,627; and in Billmeyer, F. W., Jr., Textbook of Polymer Science, Interscience Publishers, New York, N.Y., 1962, pp. 434–436, 472–475, and 504,505, all of which are incorporated herein by reference.

The polyesters may be either aliphatic, aromatic, or aliphatic-aromatic in character. The polyesters are characterized in that they have recurring ester units in the polymer chain, i.e., carboxylate groups bonded to a carbon atom of a hydrocarbon or substituted hydrocarbon radical.

The preferred polyesters for use in the instant invention generally contain at least one recurring structural unit represented by the general formula

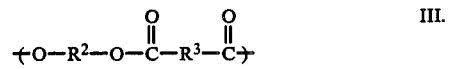

III.

wherein R$^2$ and R$^3$ are independently selected from divalent hydrocarbon radicals or substituted divalent hydrocarbon radicals.

In the case of aliphatic polyesters both R$^2$ and R$^3$ are independently selected from divalent aliphatic hydrocarbon radicals or substituted divalent aliphatic hydrocarbon radicals. The divalent aliphatic hydrocarbon radicals include the alkylene, alkenylene, alkylidene, cycloalkylene, cycloalkylidene, and cycloalkenylene radicals. Preferred alkylene radicals are those containing from 2 to about 20 carbon atoms. The preferred alkylidene radicals are those containing from 1 to about 20 carbon atoms. The preferred alkenylene radicals are those containing from 2 to about 20 carbon atoms. The preferred cycloalkylene, cycloalkylidene, and cycloalkenylene radicals are those containing from about 4 to about 8 ring carbon atoms. The substituted divalent aliphatic hydrocarbon radicals are those divalent aliphatic hydrocarbon radicals described above which contain at least one substituent group, preferably from one to about three substituent groups. The preferred substituent groups are the halogens, nitro groups, and amino groups.

The aromatic polyesters suitable for use in the instant invention generally contain at least one recurring structural unit of Formula III wherein R$^2$ and R$^3$ are independently selected from divalent aromatic radicals or substituted divalent aromatic radicals. The divalent aromatic radicals represented by R$^2$ and R$^3$ include the phenylene radical, the substituted phenylene radical, the biphenylene radical, the substituted biphenylene radical, the naphthylene radical, the substituted naphthylene radical, and radicals represented by the general formula

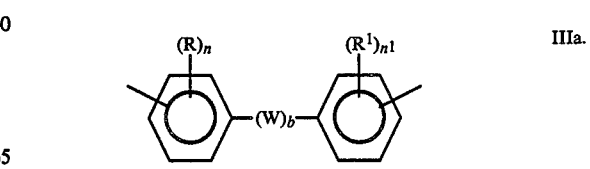

IIIa.

wherein R, R$^1$, W, n, n$^1$, and b are as defined hereinafore.

Particularly useful aromatic polyesters are those wherein $R^3$ is a phenylene radical and $R^2$ is a radical represented by Formula IIIa.

The aliphatic aromatic polyesters are those wherein one of $R^2$ or $R^3$ is a divalent aromatic radical and one of $R^2$ or $R^3$ is a divalent aliphatic radical. Preferred aliphatic aromatic polyesters are those wherein $R^2$ is a divalent aliphatic radical or substituted divalent aliphatic radical and $R^3$ is a divalent aromatic radical or a substituted divalent aromatic radical.

One class of particularly useful aliphatic aromatic polyesters are the polyalkylene terephthalates or polyalkylene isophthalates. These types of polyesters contain at least one recurring structural unit represented by the general formula

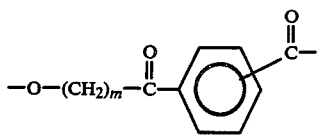

IIIb.

wherein m is a whole number having a value of from 2 to 4 inclusive. Especially preferred polyesters of Formula IIIb are polyethylene terephthalate and poly(1,4-butylene terephthalate).

Another class of particularly useful aliphatic aromatic polyesters are polyester copolymers or copolyesters which can, without limitation, comprise the reaction products of: (a) a glycol portion comprising a 1,4-cyclohexanedimethol with an acid portion comprising terephthalic acid, isophthalic acid, or mixtures thereof; or (b) a glycol portion comprising a 1,4-cyclohexanedimethanol and ethylene glycol wherein the molar ratio of the 1,4-cyclohexanedimethanol to the ethylene glycol in the glycol portion is from about B 4:1 to about 1:4, with an acid portion comprising terephthalic acid, isophthalic acid, or mixtures thereof.

These types of copolyesters may be prepared by procedures well known in the art, such as by condensation reacitons substantially as shown and described in U.S. Pat. No. 2,901,466, which is hereby incorporated herein by reference. More particularly, the acid or mixtures of acids or alkyl esters of the aromatic dicarboxylic acid or acids, for example, dimethylterephthalate, together with the dihydric alcohols are charged to a flask and heated to a temperature sufficient to cause condensation of the copolymer to begin, for example 175°–225° C. Thereafter the temperature is raised to about 250° to 300° C., and a vacuum is applied and the condensation reaction is allowed to proceed until substantially complete.

The condensation reaction may be facilitated by the use of a catalyst, with the choice of catalyst being determined by the nature of the reactants. The various catalysts for use herein are very well known in the art and are too numerous to mention individually. Generally, however, when an alkyl ester of the dicarboxylic acid compound is employed, an ester interchange type of catalyst is preferred, such as NaH Ti(OC$_4$H$_9$)$_6$ in n-butanol. If a free acid is being reacted with free glycols, a catalyst is generally not added until after the preliminary condensation has gotten under way.

The reaction is generally begun in the presence of an excess glycols and initially involves heating to a temperature sufficient to cause a preliminary condensation followed by the evaporation of excess glycol. The entire reaction is conducted with agitation under an inert atmosphere. The temperature can be advantageously increased with or without the immediate application of vacuum. As the temperature is further increased, the pressure can be advantageously greatly reduced and the condensation allowed to proceed until the desired degree of polymerization is achieved. The product can be considered finished at this stage or it can be subjected to further polymerization in the solid phase in accordance with well known techniques. Thus, the highly monomeric condensation product can be cooled, pulverized, and the powder heated to a temperature somewhat less than employed during the last stage of molten polymerization thereby avoiding coagulation of the solid particles. The solid phase polymerization is conducted until the desired degree of polymerization is achieved. The solid phase polymerization, among other things, results in a higher degree of polymerization without the accompanying degradation which frequently takes place when continuing the last stage of the melt polymerization at a temperature high enough to achieve the desired degree of polymerization. The solid phase process is advantageously conducted with agitation employing an inert atmosphere at either normal atmospheric pressure or under greatly reduced pressure.

These copolyesters will generally have an intrinsic viscosity of at least about 0.4 dl/gm as measured in 60/40 phenol/tetrachloroethane or other similar solvents at about 25° C. and will have a heat distortion temperature from about 60° C. to about 70° C. The relative amounts of the 1,4-cyclohexanedimethanol to ethylene glycol in the glycol portion of the copolyester (b) may vary so long as the molar ratio of 1,4-cyclohexanedimethanol to ethylene glycol is from about 1:4 to 4:1, in order to provide a polyester copolymer having a suitable heat distortion temperature within the recited range, and other suitable properties.

One quite useful type of copolyester is a copolyester of the type described hereinafore wherein the glycol portion has a predominance of ethylene glycol over 1,4-cyclohexanedimethanol, for example greater than 50/50 and especially preferably is about 70 molar ethylene glycol to 30 molar 1,4-cyclohexandimethanol, and the acid portion is terephthalic acid. A preferred copolyester of this type is commercially available under the trade name KODAR PETG 6763 from Eastman Chemical Co. A Preferred copolyester is one derived from 1,4-cyclohexanedimethanol as the glycol portion and a mixture of isophthalic and terephthalic acids as the acid portion. This type of copolyester is available from Eastman Chemical Co. under the trade name KODAR A150. The ratios of the polyesters to the polycarbonates in the instant compositions may vary widely. Generally, however, compositions which contain from about 5 to about 95 weight percent polycarbonate resin and from about 95 to about 5 weight percent polyester resin are preferred, while compositions which contain from about 20 to about 80 weight percent polycarbonate and from about 80 to about 20 weight percent polyester are more preferred. Weight percent polycarbonate is based on the total amounts of polycarbonate resin and polyester resin present in the compositions.

The polyols which form one component of the polyol and epoxide mixture are well known compounds which are amply described in the literature and are generally coomercially available or may be readily prepared by known and conventional methods.

They may be represented by the general formula $$R^4-(OH)_r \qquad (IV)$$

wherein:
- $R^4$ is an aliphatic hydrocarbon moiety, a substituted aliphatic hydrocarbon moiety, an aliphatic-aromatic hydrocarbon moiety, or a substituted aliphatic-aromatic hydrocarbon moiety, preferably containing from 2 to about 20 carbon atoms, with the proviso that when $R^4$ is an aliphatic-aromatic or substituted aliphatic-aromatic hydrocarbon moiety the hydroxyl groups are bonded only to the aliphatic portion of said moiety; and
- r is a positive integer having a value of from 2 up to the number of replaceable hydrogen atoms present on $R^4$, preferably having a value of from 2 to about 8.

The aliphatic hydrocarbon moieties represented by $R^4$ include the acylic aliphatic moieties and the cycloaliphatic moieties. The acylic aliphatic moieties are preferably those containing from 2 to about 20 carbon atoms in either a straight or branched chain. The cyclic aliphatic moieties are preferably those containing from 4 to about 8 ring carbon atoms. These cyclic aliphatic moieties may contain alkyl substituent groups on the ring carbon atoms, and the hydroxyl groups may be bonded to either the ring carbon atoms of the the cyclic structure or the alkyl substituent groups, or to both.

The aliphatic-aromatic hydrocarbon moieties represented by $R^4$ are those containing an aromatic portion which preferably contains from 6 to 12 ring carbon atoms, i.e., phenyl, naphthyl, and biphenyl, and an aliphatic portion, e.g., alkyl, bonded to the ring carbon atoms of the aromatic portion, with the hydroxyl groups being present only on the aliphatic portion. It is to be understood that only one aliphatic portion may be bonded to the ring carbon atoms of the aromatic portion, or two or more aliphatic portions may be bonded to the aromatic portion. If more than one aliphatic portion is bonded to the aromatic portion of the aliphatic-aromatic moiety the hydroxyl groups may be present on different aliphatic portions.

The substituted aliphatic and substituted aliphatic-aromatic moieties represented by $R^4$ are those which contain substituent groups on the hydrocarbon moieties, preferably from 1 to about 4 substituent groups. The preferred substituent groups are the halogens, preferably chlorine and bromine, amino, and nitro groups. When more than one substituent group is present they may be the same or different.

Preferred polyols of Formula IV are the acylic aliphatic polyhdric alkanols, with the hexahydric alkanols being preferred. It is generally preferred tthat these acylic aliphatic polyhydric alkanols be fully saturated. Preferred polyols of this type are those wherein the hydroxyl groups are bonded to different carbon atoms of the acyclic aliphatic hydrocarbon or substituted hydrocarbon moiety.

Some illustrative non-limiting examples of polyols represented by Formula IV include cyclohexane dimethanol, butanediol, mannitol, sorbitol, 1,3-propanediol, glycerol, 1,2-cyclopentanediol, inositol, 1,3,5-cyclohexanetriol, 1,2,3,4,5-pentahydroxypentane, and 1,1,2,2-tetrahydroxyethane.

The epoxides which form the second component of the instant epoxide/polyol combination are well known compounds which are amply described in the literature and which are generally commercially available or which may be readily prepared by well known and conventional processes. These epoxides are characterized by containing at least one oxirane

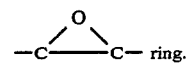 ring.

One useful group of epoxide compounds may be represented by the general formula

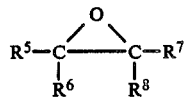 V.

wherein:
$R^5$–$R^8$ are independently selected from hydrogen, monovalent hydrocarbon radicals, substituted monovalent hydrocarbon radicals, —CH$_2$OR$^9$, —CH$_2$OCOR$^{10}$Z, —COOCH$_2$Z, —CH$_2$OR$^{10}$OCH$_2$Z, and —R$^{10}$Z radicals wherein $R^9$ is selected from monovalent hydrocarbon radicals, $R^{10}$ is a divalent hydrocarbon radical or a divalent hydrocarbon radical containing ether linkages, and Z is an oxirane ring.

The monovalent hydrocarbon radicals represented by $R^5$–$R^8$ are the same as those described for R hereinafore. The substituted monovalent hydrocarbon radicals are those as described for R except that they contain substitutent group(s) thereon, preferably from 1 to 4 substituent groups such as halogen, hydroxyl, amino, nitro, and the like.

The monovalent hydrocarbon radicals represented by $R^9$ are the same as those described for R hereinafore.

The divalent hydrocarbon radicals represented by $R^{10}$ include the alkylene, cycloalkylene, alkylidene, cycloalkylidene, arylene, alkarylene, and aralkylene radicals. The preferred alkylene radicals are those containing from 2 to about 24 carbon atoms. The preferred alkylidene radicals are those containing from 1 to about 24 carbon atoms. The preferred cycloalkylene and cycloalkylidene radicals are those containing from about 6 to about 16 ring carbon atoms. The preferred arylene radicals are those containing from 6 to 12 ring carbon atoms, i.e., phenylene, naphthalene, and biphenylene. The preferred aralkylene and alkarylene radicals are those containing from 7 to about 14 carbon atoms.

The divalent hydrocarbon radicals containing ether linkages represented by $R^{10}$ are those that contain from 2 to about 14 carbon atoms and from 1 to about 4 ether linkages. Preferred radicals of this type are the alkylene ether radicals which contain from 2 to about 14 carbon atoms and from 1 to about 4 ether linkages.

Preferred divalent hydrocarbon radicals represented by $R^{10}$ are the alkylene radicals, particularly those containing from 2 to about 24 carbon atoms.

The preferred epoxides of Formula V are those wherein at least $R^5$ and $R^6$ or $R^7$ and $R^8$ are independently selected from monovalent hydrocarbon radicals, substituted monovalent hydrocarbon radicals, —CH$_2$OR$^9$, —CH$_2$OCOR$^{10}$Z, —COOCH$_2$Z, —CH$_2$OR$^1$OCH$_2$Z, and —R$^{10}$Z, e.g., both $R^5$ and $R^6$ are monovalent hydrocarbon radicals while $R^7$ and $R^8$ can independently be hydrogen or monovalent hydrocarbon radicals, substituted monovalent hydrocarbon radicals, —CH$_2$OR$^9$, —CH$_2$OCOR$^{10}$Z, —COOCH$_2$Z, —CH$_2$OR$^{10}$OCH$_2$Z, or —R$^{10}$Z radicals.

Another class of preferred epoxides of Formula V are those wherein at least one of $R^5$ and $R^6$ and at least one of $R^7$ and $R^8$ are independently selected from aryl radicals and alkaryl radicals.

These types of epoxides are well known in the art and are generally commercially available or may be readily prepared by known and conventional methods. Some of these epoxides are described, inter alia, in U.S. Pat. No. 4,092,288, incorporated herein by reference.

Another useful group of epoxides may be represented by the general formula

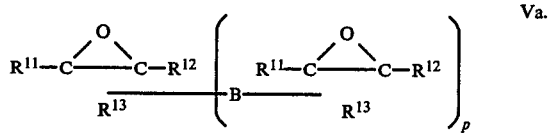

wherein:
$R^{11}$ and $R^{12}$ independently have the same meaning as $R^5$-$R^8$ described hereinafore;
$R^{13}$ is independently selected from a divalent hydrocarbon radical or a substituted divalent hydrocarbon radical which together with the two carbon atoms of the oxirane ring forms a ring system containing from 1 to 3 rings haing from 4 to about 20 carbon atoms;
p is either zero or one; and
B is a divalent radical selected from divalent hydrocarbon radicals, divalent hydrocarbon radicals containing at least one ether linkage, and

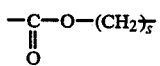

radicals wherein s has a value of from 1 to about 6.

The preferred divalent hydrocarbon radicals represented by $R^{13}$ are the divalent aliphatic hydrocarbon and substituted hydrocarbon radicals. These aliphatic radicals may be fully saturated or may contain one or two olefinic unsaturation sites, i.e., carbon-to-carbon double bonds. The preferred divalent aliphatic hydrocarbon radicals and substituted divalent aliphatic hydrocarbon radicals are the alkylene, alkenylene, cycloalkylene and cycloalkenylene radicals, with the alkylene and alkenylene radicals being preferred. The preferred alkylene radicals are those containing from 2 to about 18 carbon atoms. The preferred alkenylene radicals are those containing from 2 to about 18 carbon atoms and one or two double bonds. The substituted divalent aliphatic hydrocarbon radicals contain from 1 to about 4 substituent groups. The preferred substituent groups are the $C_1$-$C_{12}$ alkyls, $C_4$-$C_{10}$ cycloalkyls, aralkyls or alkaryls of from 7 to about 14 carbon atoms, aryls of from 6-12 ring carbon atoms, halogens, and hydroxyl. When more than one substituent group is present they may be the same or different.

The divalent hydrocarbon radicals and the divalent hydrocarbon radicals containing at least one ether linkage represented by B are the same as those described for $R^{10}$ hereinafore. The preferred divalent hydrocarbon radicals represented by B are the alkylene radicals, preferably those containing from 2 to about 24 carbon atoms.

These types of epoxide are well known in the art and are generally commercially available or may be readily prepared by known and conventional processes. Some of these types of epoxides are described, inter alia, in U.S. Pat. No. 4,154,329, incorporated herein by reference.

Some illustrative non-limiting example of the epoxides of Formula Va include, when p is zero, the derivatives of epoxy cyclohexane and cyclododecane epoxide. When p is one the epoxides of Formula Va include compounds such as

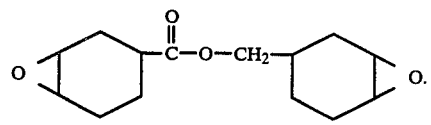

As mentioned above the epoxides of Formula Va include the derivatives of epoxy cyclohexane. These derivatives of epoxy cyclohexane may be represented by the general formula

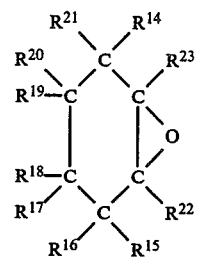

wherein $R^{14}$-$R^{23}$ independently have the same meaning as $R^5$-$R^8$ hereinafore.

Preferred epoxides of Formula Vb are those wherein art least one of $R^{22}$ and $R^{23}$ is a radical other than hydrogen.

These derivatives of epoxy cyclohexane are well known in the art and are generally commercially available or may be readily prepared by known and conventional methods. They are described, inter alia, in U.S. Pat. No. 3,978,020, incorporated herein by reference.

Yet another group of epoxides that are useful may be represented by the general formula

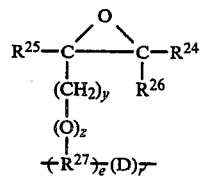

wherein:
$R^{24}$-$R^{26}$ are independently selected from hydrogen, monovalent hydrocarbon radicals, and substituted monovalent hydrocarbon radicals;
$R^{27}$ is a divalent hydrocarbon radical, a substituted divalent hydrocarbon radical, or a divalent hydrocarbon radical containing at least one ether linkage;
e has a value of at least one;
r' has a value of zero or at least one;
y has a value of from 0 to 4 inclusive;
z is either zero or one, with the proviso that y and z are not both zero; and
D is a divalent hydrocarbon radical, a substituted divalent hydrocarbon radical, or a divalent hydrocarbon radical containing at least one ether linkage.

The divalent hydrocarbon radicals and divalent hydrocarbon radicals containing at least one ether linkage represented by $R^{27}$ and D are the same as those described for $R^{10}$ hereinafore. The substituted divalent hydrocarbon radicals represented by $R^{27}$ and D are those divalent hydrocarbon radicals as described for $R^{10}$ except that they contain from 1 to about 4 substituent groups which may be selected from $C_1$-$C_{12}$ alkyl, halogen, nitro, amino, and hydroxyl.

The monovalent hydrocarbon radicals represented by $R^{24}$-$R^{26}$ are the same as those described for $R^5$-$R^8$ hereinafore. Likewise, the substituted monovalent hydrocarbon radicals represented by $R^{24}$-$R^{26}$ are the same as those described for $R^5$-$R^8$ hereinafore.

Illustrative of the epoxides of Formula Vc are those wherein z is one, y is one, $R^{24}$-$R^{26}$ are hydrogen, r' is zero, e is greater than one, and $R^{27}$ is an aromatic radical, preferably a $C_6$ aromatic radical. These types of compounds, e.g., epoxy novolac resins, are generally available commercially or may readily be prepared by known and conventional methods.

Still another group of epoxides that may be employed in the practice of the present invention are the triglycidylisocyanurates. These triglycidylisocyanurates may be represented by the general formula

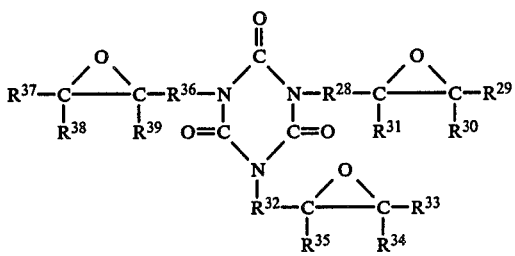

Vd.

wherein:
$R^{29}$-$R^{31}$, $R^{33}$-$R^{35}$, and $R^{37}$-$R^{39}$ independently have the same meaning as $R^5$-$R^8$ hereinafore; and
$R^{28}$, $R^{32}$ and $R^{36}$ are independently selected from alkylene radicals containing from 1 to about 8 carbon atoms.

These triglycidylisocyanurates as well known in the art and are generally commercially available or may be readily prepared by known and conventional processes.

An illustrative non-limiting example of a compound of Formula Vd is one wherein $R^{29}$-$R^{31}$, $R^{33}$-$R^{35}$ and $R^{37}$-$R^{39}$ are all hydrogen; and $R^{28}$, $R^{32}$ and $R^{36}$ are all the methylene radical.

Still another group of epoxides that may be employed as stabilizers in the practice of the instant invention are the aromatic glycidyl ethers. These aromatic glycidyl ethers may be the monoglycidyl ethers, the diglycidyl ethers, or the aromatic polyglycidyl ethers containing from 1 or more aromatic rings. These types of epoxides are disclosed in U.S. Pat. No. 3,839,247, which is incorporated herein by reference. Some illustrative non-limiting examples of these compounds include glycidol, bisphenol-A diglycidyl ether, tetrabromo bisphenol-A diglycidyl ether, diglycidyl ester of phthalic acid, and the like.

Some illustrative non-limiting examples of the epoxide compounds which may be utilized in the practice of the present invention include: cyclodododecane epoxide; ethylene glycol diglycidylether; triglycidylisocyanurate; 7-oxabicyclo[4.1.0]-3-methyl-3[7-oxabicyclo[4.1.0]heptane] carboxylate; 3,4-epoxycyclohexylmethyl-3,4-epoxy-cyclohexane carboxylate; 3,4-epoxy-cyclohexyl-ethylene-oxide; diglycidyl ester of hexahydrophthalic acid; bis-epoxy dicyclopentadienyl ether; limonene monoxide, tetraphenyl-ethylene epoxide; butadiene epoxide; octyl epoxy tallate; 3,4-dimethyl-1,2-epoxy cyclohexane; 3,5-dimethyl-1,2-epoxy cyclohexane; 4,5-epoxyoctane; 4,5-epoxy-4,5-dimethyloctane; 1,2-epoxy-1-propyl-cyclohexane; 1,2-epoxycyclohexane; 2,3-epoxy-3-methylbutane; 1,3-epoxybutane; 1,1-diphenyl ethylene oxide; diethyl-di-n-butyl-3-tert-butyl-4,5-epoxy-cis-1,2-cyclohexane carboxylate; octadecyl-3,4-epoxy-cyclohexane carboxylate; and the like.

Generally, the stabilizer contains a weight ratio of polyol to epoxide of from about 1:10 to about 10:1, preferably from about 1:5 to about 5:1, and more preferably from about 1:3 to about 3:1.

While the use of a polyol alone as a color stabilizer is effective in reducing or retarding color formation in the instant polycarbonate/polyester blends, the addition of the epoxide to the polyol surprisingly has an unexpected effect upon the efficacy of the polyol in stabilizing or diminishing color formation, i.e., yellowing, in the blend. The use of the instant color stabilizer combination results in improved color stabilization or retardation of color formation such as yellowing. This improvement also allows the use of relatively smaller amounts of the instant color stabilizer package to obtain comparable or even better color stabilization than obtainable with the polyol alone.

Surprisingly, the use of the epoxide alone generally has no profound effect upon stabilizing or retarding color formation in the polycarbonate/polyester blends. It is thus surprising and unexpected that the combination of a polyol and an epoxide results in improved color stabilization or retardation in the polycarbonate/polyester blends.

The amount of the instant stabilizer added to the polycarbonate/polyester blends is an amount which is effective to stabilize or retard color formation, particularly yellowing, in the polycarbonate/polyester blends. Generally, this amount is at least about 0.01 weight percent, preferably at least about 0.05 weight percent. Weight percent is based on the total amounts of said color stabilizer combination and the blend of polycarbonate/polyester present in the instant compositions. Generally, the amount of color stabilizer mixture present should not exceed about 5 weight percent, preferably it should not exceed about 2 weight percent.

In general, if less than about 0.01 weight percent of color stabilizer is present there is no appreciable stabilization or retardation of color formation in the instant blends. If more than about 5 weight percent of the color stabilizer is used than some of the advantageous properties of the polycarbonate/polyester blends may be adversely affected. The amount of stabilizer used is thus an amount which is effective to stabilize the color of said blends or retard color formation therein but insufficient to substantially deleteriously affect substantially most of the advantageous properties of said blends.

The instant compositions may optionally contain various commonly known and used additives such as, for example, antioxidants; antistatic agents; mold release agents; ultraviolet radiation absorbers such as the benzophenones, benzotriazoles, and cyanoacrylates; additional color stabilizers selected from the organophosphites; fillers such as talc, glass, mica, and clay; and flame retardants. Some useful flame retardants are the alkali and alkaline earth metals salts or organosulfonic acids. These types of flame retardants are disclosed, inter alia, in U.S. Pat. Nos. 3,933,734, 3,931,100, 3,978,024, 3,948,851, 3,926,908, 3,919,167, 3,909,490, 3,953,396, 3,953,396, 3,953,399, 3,917,559, 3,951,910, and 3,940,366.

DESCRIPTION OF THE PREFERRED EMBODIMENT

The following examples are set forth to further illustrate the present invention. These examples are not to be construed as limiting the invention thereto as they are set forth by way of illustration. Unless otherwise specified, all parts and percentages given in the examples are parts and percentages by weight.

The following examples illustrate compositions falling outside the scope of the instant invention. They are presented for comparative purposes only.

EXAMPLE 1

This example illustrates a polycarbonate/polyester blend containing neither the polyol color stabilizer nor an epoxide.

A blend is prepared by thoroughly mixing 50 parts by weight of an aromatic polycarbonate resin derived from bisphenol-A and 50 parts by weight of a copolyester derived from 1,4-cyclohexane dimethanol and a mixture of isophthalic acid and terephthalic acid (KODAR A150 marketed by Eastman Chemical Co.) This mixture is then injection molded into test plaques $\frac{1}{8}$" thick. The Yellowness Index (Y.I.) of these test plaques is then measured on a Gardner colorimeter in accordance with test method ASTM D1925, and the results are set forth in Table I.

EXAMPLE 2

This example illustrates a polycarbonate/polyester blend containing only a conventional organophosphite color stabilizer.

The procedure of Example 1 is substantially repeated except that the mixture contains 0.03 parts by weight per hundred parts by weight of resin (phr) of an organo-phosphite color stabilizer.

EXAMPLE 3

This example illustrates a polycarbonate/polyester blend containing a conventional organo-phosphite color stabilizer and a mannitol color stabilizer.

The procedure of Example 1 is substantially repeated except that the mixture additionally contains 0.06 phr of an organo-phosphite color stabilizer and 0.15 phr of mannitol.

EXAMPLE 4

This example illustrates a polycarbonate/polyester blend containing a conventional organo-phosphite color stabilizer and a diepoxide, (7-oxabicyclo[4.1.0]-3-methyl-3-[7-oxabicyclo[4.1.0]heptane]carboxylate).

The procedure of Example 1 is substantially repeated except that the mixture additionally contains 0.06 phr of an organo-phosphite color stabilizer and 0.15 phr of the diepoxide.

The following examples illustrate the compositions of the present invention.

EXAMPLE 5

The procedure of Example 1 is substantially repeated except that the mixture additionally contains 0.15 parts by weight per hundred parts by weight of the 50/50 polycarbonate and polyester blend of mannitol and 0.07 parts by weight per hundred parts by weight of resin blend of 7-oxabicyclo[4.1.0]heptyl-3-methyl-3-[7-oxabicyclo[4.1.0]heptane carboxylate.

EXAMPLES 6–15

The procedure of Example 1 is substantially repeated except that the resin mixture additionally contains 0.15 parts by weight per hundred parts by weight or resin blend of mannitol, and varying amounts of various epoxides, the amounts and types of epoxides being set forth in Table I as phr (parts by weight per hundred parts by weight of resin blend).

TABLE I

| Additive (phr)** | 1* | 2* | 3* | 4* | 5 | 6 | 7 | 8 | 9 | 10 | 11 | 12 | 13 | 14 | 15 |
|---|---|---|---|---|---|---|---|---|---|---|---|---|---|---|---|
| mannitol | — | — | 0.15 | — | 0.15 | 0.15 | 0.15 | 0.15 | 0.15 | 0.15 | 0.15 | 0.15 | 0.15 | 0.15 | 0.15 |
| epoxide 1 | — | — | — | 0.15 | 0.07 | 0.15 | 0.50 | — | — | — | — | — | — | — | — |
| epoxide 2 | — | — | — | — | — | — | — | 0.1 | 0.15 | — | — | — | — | — | — |
| epoxide 3 | — | — | — | — | — | — | — | — | — | 0.22 | — | — | — | — | — |
| epoxide 4 | — | — | — | — | — | — | — | — | — | — | 0.12 | — | — | — | — |
| epoxide 5 | — | — | — | — | — | — | — | — | — | — | — | 0.15 | 0.77 | — | — |
| epoxide 6 | — | — | — | — | — | — | — | — | — | — | — | — | — | 0.15 | 0.72 |
| YI | 65.7 | 64.6 | 7.7 | 47.0 | 2.6 | 2.7 | 4.5 | 2.7 | 2.7 | 4.2 | 3.8 | 5.6 | 3.7 | 5.4 | 4.6 |

*indicates comparative examples, examples 2–4 also contain 0.06 phr of an organo-phosphite.
**the amount of additive is parts by weight of additive per hundred parts by weight of resin blend, with the resin blend being comprised of a 50/50 weight mixture of polycarbonate and polyester.
epoxide 1 = 7-oxabicyclo[4.1.0]heptyl-3-methyl-3-[7-oxabicyclo[4.1.0]heptane]carboxylate.
epoxide 2 = ethylene glycol diglycidylether.
epoxide 3 = cyclododecane epoxide.
epoxide 4 = ARALDITE GT 7072, a solid, unmodified epoxy resin based on bisphenol-A.
epoxide 5 = EPON 1002, a bisphenol-A epichlorohydrin resin.
epoxide 6 = triglycidylisocyanurate.

As illustrated by the data in Table I the addition of a conventional organophosphite color stabilizer to a polycarbonate/polyester blend (Example 2) does not have a dramatic effect upon the Yellowness Index (YI) of said blend, lowering it less than one point. The addition of both said organophosphite and an epoxide to said blend (Example 4), while having a significant effect upon the YI, still results in compositions having quite high YI. The addition of a polyol and an organophosphite color stabilizer (Example 3) to the polycarbonate/polyester blends is quite effective in lowering the YI of these blends.

In view of the rather poor effectiveness of epoxides as color inhibitors in those polycarbonate/polyester blends which tend to yellow (Example 4) it is surprising and unexpected that the instant combinations of an epoxide and a polyol (Examples 5–15) are so effective in reducing the YI of these blends. Indeed, in some instances (Example 5, 6, 8, 9, 11 and 12) reducing it to less than half of that of a blend containing a polyol (Example 3).

The instant compositions are useful for the preparation of shaped articles, e.g., extruded and molded parts exhibiting reduced yellowing.

The combination of the polyol and epoxide of the instant invention can also advantageously be added to or admixed with those polycarbonate/polyester resin blends where discoloration or yellowing is not a significant problem, since this combination of polyol and epoxide, in addition to reducing yellowing in those blends which tend to yellow, also inhibits or reduces transesterification in polycarbonate/polyester resin blends which are subject to transesterification. In such cases these compositions contain from about 0.01 to about 5 weight percent of the combination of at least one polyol and at least one epoxide, preferably from about 0.05 to about 2 weight percent, and more preferably from about 0.1 to about 1 weight percent. Weight percent of polyol and epoxide mixture is based on the total amounts of said mixture and the resin blend present.

Obviously, other modifications and variations of the present invention are possible in light of the above teachings. It is, therefore, to be understood that changes may be made in the particular embodiments of the invention described which are within the full intended scope of the invention as defined by the appended claims.

What is claimed is:

1. A resinous composition comprising:
   (i) at least one aromatic polycarbonate resin;
   (ii) at least one aliphatic, aromatic, or aliphatic-aromatic polyester resin having recurring carboxylate ester units in the resin; and
   (iii) a minor amount of a mixture of at least one polyol and at least one epoxide, said polyol of the formula $$R^4-(OH)_r$$

wherein
   $R^4$ is an aliphatic hydrocarbon moiety, a substituted aliphatic hydrocarbon moiety, an aliphatic-aromatic hydrocarbon moiety, or a substituted aliphatic-aromatic hydrocarbon moiety, with the proviso that when $R^4$ is an aliphatic-aromatic or substituted aliphatic-aromatic hydrocarbon moiety the hydroxyl groups are bonded only to the aliphatic portion of said moiety; and
   r is a positive integer having a value of from 2 up to the number of replaceable hydrogen atoms present on $R^4$.

2. The composition of claim 1 which contains from about 0.01 to about 5 weight percent of (iii), based on the total amounts of (i)–(iii) present.

3. The composition of claim 2 which contains from about 0.05 to about 2 weight percent of (iii).

4. The composition of claim 1 wherein said epoxide is selected from monomeric and polymeric epoxides.

5. The composition of claim 4 wherein said epoxide is a monomeric epoxide represented by the formula

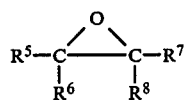

wherein:
$R^5$–$R^8$ are independently selected from hydrogen, monovalent hydrocarbon radicals, substituted monovalent hydrocarbon radicals, —$CH_2OR^9$, —$CH_2OCOR^{10}Z$, —$COOCH_2Z$, —$CH_2OR^1$-$OCH_2Z$, or —$R^{10}Z$ radicals, wherein $R^9$ is selected from monovalent hydrocarbon radicals $R^{10}$ is selected from divalent hydrocarbon radicals or divalent hydrocarbon radicals containing at least one ether linkage, and Z is an oxirane ring.

6. The composition of claim 4 wherein said monomeric epoxide is represented by the formula

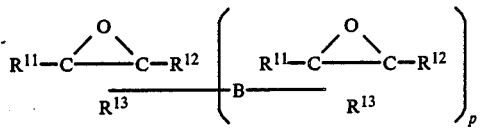

wherein:
$R^{11}$ and $R^{12}$ are independenttly selected from hydrogen, monovalent hydrocarbon radicals, substituted monovalent hydrocarbon radicals, —$CH_2OR^9$, —$CH_2OCOR^{10}Z$, —$COOCH_2Z$, —$CH_2OR^1$-$OCH_2Z$, or —$R^{10}Z$ radicals, wherein $R^9$ is selected from monovalent hydrocarbon radicals, $R^{10}$ is selected from divalent hydrocarbon radicals or divalent hydrocarbon radicals containing at least one ether linkage, and Z is an oxirane ring;
$R^{13}$ is independently selected from divalent hydrocarbon or substituted divalent hydrocarbon radicals;
B is selected from divalent hydrocarbon radicals, divalent hydrocarbon radicals having at least one ether linkage, or

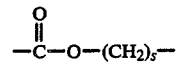

radicals wherein s has a value of from 1 to about 6; and
p is either zero or one.

7. The composition of claim 6 wherein p is zero.

8. The composition of claim 7 wherein said epoxide is cyclododecane epoxide.

9. The composition of claim 7 wherein said epoxide is epoxy cyclohexane.

10. The composition of claim 6 wherein p is one.

11. The composition of claim 10 wherein B is the

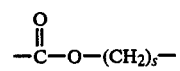

radical.

12. The composition of claim 11 wherein s is one.

13. The composition of claim 12 wherein each $R^{13}$ is a $C_4$ alkylene radical.

14. The composition of claim 13 wherein $R^{11}$ and $R^{12}$ are hydrogen.

15. The composition of claim 4 wherein said monomeric epoxide is represented by the formula

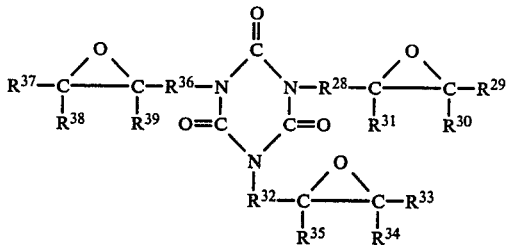

wherein:

$R^{29}$–$R^{31}$, $R^{33}$–$R^{35}$ and $R^{37}$–$R^{39}$ are independently selected from hydrogen, monovalent hydrocarbon radicals, substituted monovalent hydrocarbon radicals, —$CH_2OR^9$, —$CH_2OCOR^{10}Z$, —$COOCH_2Z$, —$CH_2OR^{10}OCH_2Z$, or —$R^{10}Z$ radicals, wherein $R^9$ is selected from monovalent hydrocarbon radicals, $R^{10}$ is selected from divalent hydrocarbon radicals or divalent hydrocarbon radicals containing at least one ether linkage, and Z is an oxirane ring:

and $R^{28}$, $R^{32}$ and $R^{36}$ are independently selected from alkylene radicals.

16. The composition of claim 15 wherein $R^{29}$–$R^{31}$, $R^{33}$–$R^{35}$ and $R^{37}$–$R^{39}$ are hydrogen.

17. The composition of claim 16 wherein $R^{28}$, $R^{32}$ and $R^{36}$ are the methylene radical.

18. The composition of claim 4 wherein said epoxide compounds are polymeric epoxides.

19. The composition of claim 18 wherein said polymeric epoxides are bisphenol-A type epoxide resins.

20. The composition of claim 19 wherein said polymeric epoxides are bisphenol-A epichlorohydrin epoxy resins.

21. The composition of claim 18 wherein said polymeric epoxides are epoxy novolac resins.

22. The composition of claim 1 wherein $R^4$ contains from 2 to about 20 carbon atoms.

23. The composition of claim 22 wherein r has a value of from 2 to about 8.

24. The composition of claim 23 wherein said polyol is an acyclic aliphatic polyhydric alkanol.

25. The composition of claim 24 wherein said polyol is an acyclic aliphatic straight chain hexahydric alkanol.

26. The composition of claim 20 wherein said polyol is mannitol.

27. The composition of claim 1 which contains an antiyellowing effective amount of (iii).

28. The composition of claim 27 wherein said amount of (iii) is at least about 0.01 weight percent, based on the total amounts of (i)–(iii) present.

29. The composition of claim 28 wherein said amount of (iii) is at least about 0.05 weight percent.

30. The composition of claim 1 wherein said polyester is a poly(alkylene terephthalate).

31. The composition of claim 30 wherein said poly(alkylene terephthalate) is poly(butylene terephthalate).

32. The composition of claim 1 wherein said polyester is comprised of the reaction products of a glycol portion comprised of 1,4-cyclohexane dimethanol, ethylene glycol, or mixtures thereof, and an acid portion comprising isophthalic acid, terephthalic acid, or mixtures thereof.

33. The composition of claim 1 which additionally contains a flame retardant amount of at least one flame retardant compound.

34. The composition of claim 33 wherein said flame retardant compound is selected from the alkali or alkaline earth metal salts of organic sulfonic acids.

* * * * *